United States Patent
Colineau et al.

(10) Patent No.: US 10,029,356 B2
(45) Date of Patent: Jul. 24, 2018

(54) MOUNTING DEVICE FOR A SEALING RING

(71) Applicant: CARL FREUDENBERG KG, Weinheim (DE)

(72) Inventors: Francois Colineau, Weinheim (DE); Guenter Hintenlang, Abtsteinach (DE); Martin Heldmann, Lindenfels (DE); Horst Spiegelhalter, Hirschberg (DE)

(73) Assignee: Carl Freudenberg KG, Weinheim (DE)

( * ) Notice: Subject to any disclaimer, the term of this patent is extended or adjusted under 35 U.S.C. 154(b) by 408 days.

(21) Appl. No.: 14/935,478

(22) Filed: Nov. 9, 2015

(65) Prior Publication Data
US 2016/0151896 A1 Jun. 2, 2016

(30) Foreign Application Priority Data
Nov. 13, 2014 (DE) .......... 10 2014 016 722

(51) Int. Cl.
B25B 27/00 (2006.01)
F16J 15/32 (2016.01)
(Continued)

(52) U.S. Cl.
CPC .......... B25B 27/0028 (2013.01); F16J 15/02 (2013.01); F16J 15/3268 (2013.01); Y10T 29/53657 (2015.01)

(58) Field of Classification Search
CPC ............ B25B 27/0028; Y10T 29/53657; F16J 15/3268
See application file for complete search history.

(56) References Cited

U.S. PATENT DOCUMENTS 2,860,535 A * 11/1958 Fowler .................. F16B 43/001
29/280
2,861,330 A * 11/1958 Kratz .................. B25B 27/0028
29/254
(Continued)

FOREIGN PATENT DOCUMENTS

DE 2340275 C2 10/1974
DE 2540556 A1 4/1976
(Continued)

Primary Examiner — Nicholas L Foster
(74) Attorney, Agent, or Firm — Leydig, Voit & Mayer, Ltd.

(57) ABSTRACT

A mounting device for a sealing ring, having a transport/mounting protective sleeve for the sealing ring and a sleeve-shaped punch with which the transport/mounting protective sleeve is movable on both sides in axial direction and automatically removable, wherein the protective sleeve has an inner step, extending axially, and an outside diameter corresponding to the outside diameter of a machine element to be sealed, and an axial length substantially corresponding to the axial length of the sealing ring, wherein the inner step is bounded axially counter to mounting direction by at least one end-side stop for the sealing ring, which stop forms part of an outer step likewise extending in the axial direction, wherein the outer step has a first driver surface with which at least one latching-lug-shaped driver of the punch can be engaged for automatic removal of the protective sleeve when the punch moves counter to the mounting direction.

16 Claims, 3 Drawing Sheets

(51) Int. Cl.
*F16J 15/02* (2006.01)
*F16J 15/3268* (2016.01)

(56) References Cited

U.S. PATENT DOCUMENTS

| | | | | |
|---|---|---|---|---|
| 2,998,644 A * | 9/1961 | Thill | B25B 27/0028 | 29/275 |
| 3,030,702 A * | 4/1962 | Fowler | B25B 27/0028 | 29/280 |
| 3,092,902 A * | 6/1963 | Fowler | B25B 27/0028 | 29/275 |
| 3,165,949 A * | 1/1965 | Thill | B25B 27/0028 | 29/275 |
| 3,947,944 A | 4/1976 | Washington | | |
| 4,218,813 A | 8/1980 | Cather, Jr. | | |
| 4,515,376 A * | 5/1985 | Okamuro | B25B 27/0028 | 277/551 |
| 4,551,898 A * | 11/1985 | Provost | B25B 27/0028 | 29/235 |
| 4,815,884 A * | 3/1989 | Halliday, Jr. | B25B 27/0028 | 277/551 |
| 5,013,050 A * | 5/1991 | Curtis | B25B 27/0028 | 29/235 |
| 5,052,695 A * | 10/1991 | Curtis | B25B 27/0028 | 29/235 |
| 5,709,018 A * | 1/1998 | Dugan | B23P 19/084 | 29/235 |
| 5,890,271 A * | 4/1999 | Bromley | B25B 27/0028 | 29/255 |
| 6,065,198 A * | 5/2000 | Vitous | B25B 27/0028 | 29/258 |
| 7,059,608 B2 * | 6/2006 | Ramsay | F16J 15/008 | 277/551 |
| 7,131,197 B1 * | 11/2006 | Biro | B25B 27/0028 | 29/888.3 |
| 7,284,759 B2 * | 10/2007 | Heldmann | B25B 27/0028 | 277/351 |
| 7,651,102 B2 * | 1/2010 | Heldmann | B25B 27/0028 | 277/551 |
| 8,292,302 B2 * | 10/2012 | Heldmann | B25B 27/0028 | 277/551 |
| 8,474,828 B2 * | 7/2013 | Heldmann | B25B 27/0028 | 277/551 |
| 8,756,784 B2 * | 6/2014 | Harmon | F16J 15/3268 | 277/551 |
| 8,910,948 B2 * | 12/2014 | Heldmann | B25B 27/0028 | 277/551 |
| 9,511,486 B2 * | 12/2016 | Lammers | B25B 27/0028 | |
| 9,636,810 B2 * | 5/2017 | Lammers | B25B 27/0028 | |
| 2005/0109889 A1 * | 5/2005 | Heldmann | B25B 27/0028 | 248/74.1 |
| 2005/0258181 A1 * | 11/2005 | Heldmann | B25B 27/0028 | 220/837 |
| 2007/0067978 A1 * | 3/2007 | Relan | B25B 27/0092 | 29/451 |
| 2010/0084417 A1 * | 4/2010 | Heldmann | B25B 27/0028 | 220/836 |
| 2011/0179620 A1 * | 7/2011 | Harmon | F16J 15/3268 | 29/426.2 |
| 2011/0185844 A1 | 8/2011 | Pietras | | |
| 2012/0228834 A1 * | 9/2012 | Heldmann | B25B 27/0028 | 277/551 |
| 2013/0256995 A1 | 10/2013 | Heldmann et al. | | |
| 2015/0267815 A1 * | 9/2015 | Lammers | F16J 15/3268 | 277/309 |
| 2017/0043461 A1 * | 2/2017 | Lammers | F16J 15/3268 | |

FOREIGN PATENT DOCUMENTS

| | | |
|---|---|---|
| DE | 3202381 A1 | 8/1983 |
| DE | 10219930 A1 | 11/2003 |
| DE | 10325254 B4 | 1/2005 |
| DE | 102011009352 A1 | 8/2011 |
| DE | 102012009068 A1 | 11/2013 |
| EP | 1916509 A1 | 4/2008 |
| GB | 1446275 A | 8/1976 |

* cited by examiner

MOUNTING DEVICE FOR A SEALING RING

CROSS-REFERENCE TO RELATED APPLICATIONS

Priority is claimed to German Patent Application No. DE 10 2014016722.4, filed on Nov. 13, 2014, the entire disclosure of which is hereby incorporated by reference herein

FIELD

The invention relates to a mounting device for a sealing ring, comprising a transport and mounting protective sleeve for the sealing ring, and a punch by means of which the transport and mounting protective sleeve is displaceable in the axial direction.

BACKGROUND

Such a mounting device is known from DE 23 40 275 C2. The transport and mounting protective sleeve, for limiting the axial pushing-in movement thereof, has a flange which extends in the radial direction and can be placed against an end-side stop of a machine element to be sealed, for example a shaft.

The transport and mounting protective sleeve is composed of a plastic and, immediately after the sealing ring is produced, is pressed into the latter by an automatic device.

In order to mount the sealing ring, the transport and mounting protective sleeve is placed with the sealing ring onto the machine element to be sealed, wherein the transport and mounting protective sleeve with the sealing ring mounted thereon is subsequently pressed in the mounting direction by a punch. Shortly before the designated installation position of the sealing ring is reached, the transport and mounting protective sleeve comes to rest with the flange thereof on the end-side stop of the machine element to be sealed, the punch is moved axially further in the mounting direction, and the sealing lip of the sealing ring slides from the transport and mounting protective sleeve into the designated installation position of said sealing lip. The punch is then moved back in the opposite direction to the mounting direction. The transport and mounting protective sleeve is subsequently removed and thrown away.

SUMMARY OF THE INVENTION

An aspect of the invention provides a mounting device for a sealing ring, the device comprising: a transport/mounting protective sleeve for the sealing ring; and a sleeve-shaped punch, wherein the transport/mounting protective sleeve is movable on both sides in an axial direction using the sleeve-shaped punch, wherein the transport/mounting protective sleeve is automatically removable using the sleeve-shaped punch after the sealing ring is mounted, wherein the transport/mounting protective sleeve includes an inner step, the inner step extending in the axial direction, wherein the inner step has an outside diameter corresponding to an outside diameter of a machine element to be sealed by the sealing ring, wherein the inner step has an axial length substantially corresponding to the axial length of the sealing ring to be mounted, wherein the inner step is bounded axially in an opposite direction to the mounting direction by at least one end-side stop for the sealing ring, wherein the end-side stop forms part of an outer step, likewise extending in the axial direction, wherein the outer step includes a first driver surface, and wherein the first driver surface is configured such that, with the first driver surface, at least one latching-lug-shaped driver of the sleeve-shaped punch can be brought into engagement for automatic removal of the transport/mounting protective sleeve, when the punch moves in the opposite direction to the mounting direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
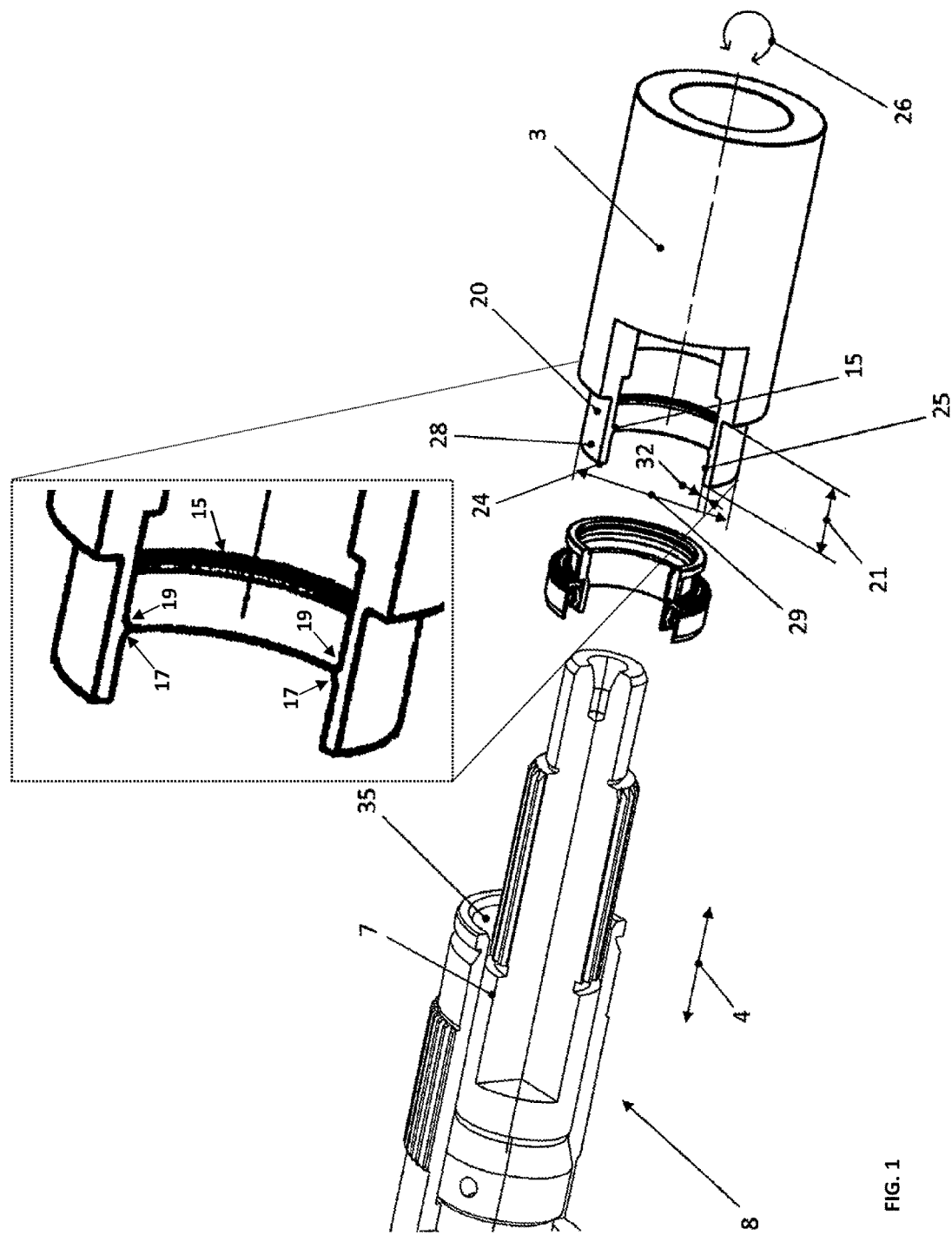
In FIG. 1: a mounting device which comprises a transport and mounting protective sleeve and a sleeve-shaped punch, wherein the transport and mounting protective sleeve, the sleeve-shaped punch and a machine element to be sealed are each shown in a perspective illustration in the form of an exploded drawing, In FIG. 2: the sealing ring from FIG. 1 which forms a preassemblable unit with the transport and mounting protective sleeve, and In FIG. 3: a partial view of the sleeve-shaped punch from FIG. 1 is illustrated together with a partial view of the transport and mounting protective sleeve from FIG. 2.

An aspect of the invention provides a mounting device of the type mentioned at the beginning in such a manner that the mounting operation is simplified and further automated, in particular that the transport and mounting protective sleeve is automatically removed following the mounting of the sealing ring.

An aspect of the invention provides a mounting device for a sealing ring, comprising a transport and mounting protective sleeve for the sealing ring and a sleeve-shaped punch by means of which the transport and mounting protective sleeve is movable in both sides in the axial direction and is automatically removable after the sealing ring is mounted, wherein the transport and mounting protective sleeve comprises an inner step which extends in the axial direction and has an outside diameter which corresponds to the outside diameter of a machine element to be sealed by the sealing ring and has an axial length which substantially corresponds to the axial length of the sealing ring to be mounted, wherein the inner step is bounded axially in the opposite direction to the mounting direction by at least one end-side stop for the sealing ring, which stop forms part of an outer step likewise extending in the axial direction, wherein the outer step has a first driver surface with which at least one latching-lug-shaped driver of the punch can be brought into engagement for the automatic removal of the transport and mounting protective sleeve when the punch moves in the opposite direction to the mounting direction.

The following is explained with regard to the function of the mounting device:

The sealing ring to be mounted can be, for example, any type of radial shaft sealing ring, for example with or without an annular helical spring and/or with or without a return helix on the sealing lip of the sealing ring for returning the medium to be sealed into the space to be sealed. First of all, the sealing ring to be mounted surrounds the transport and mounting protective sleeve and forms a preassemblable unit therewith. The sealing ring is arranged here on the inner step of the transport and mounting protective sleeve and, with its at least one dynamically stressed sealing lip, surrounds the inner step. The inner step is provided on the side facing away axially from the mounting direction with an end-side stop which is in bearing contact with the corresponding end side of the sealing ring during the mounting. As a result, the transport and mounting protective sleeve and the sealing ring arranged thereon are moved together in the mounting direction into the installation space by means of the punch. On the side facing away axially from the inner step, the stop is adjoined by the outer step which has the first driver surface on the side facing away axially from the inner step. The first driver surface is preferably designed as an undercut. Said first driver surface of the transport and mounting protective sleeve is required in order to be able to pull off the transport and mounting protective sleeve by means of the mounting punch following the mounting of the sealing ring and, as a result, to remove said protective sleeve from the installation space of the sealing ring.

In order to be able to pull off the transport and mounting protective sleeve, the punch has the latching-lug-shaped driver. During movement axially in the mounting direction, the driver moves over the first driver surface, in the process pushes the sealing ring from the transport and mounting protective sleeve into the installation position thereof and subsequently, during the movement thereof axially in the opposite direction to the mounting direction, carries along the transport and mounting protective sleeve by the latching-lug-shaped driver of the punch being brought into engagement with the first driver surface of the transport and mounting protective sleeve and the transport and mounting protective sleeve thereby being removed from the machine element to be sealed.

The mounting of the sealing ring and the removal of the transport and mounting protective sleeve take place by in each case only a single axial to and fro movement of the punch, and virtually fully automatically and with high process reliability. The mounting device here has a simple and cost-effective construction with few parts. It is crucial that the transport and mounting protective sleeve and the punch are structurally coordinated with each other for the previously described interaction thereof.

The first driver surface can be formed by the end side of the outer step, which end side faces the inner step axially. The first driver surface is arranged on that side of the outer step which faces away axially from the sealing ring. During the automatic removal, the latching-lug-shaped driver of the punch is therefore attached to the axially end-side end of the transport and mounting protective sleeve. The risk of the transport and mounting protective sleeve tilting during the automatic removal thereof by the driver of the punch and of functional impairments occurring as a result is thereby reduced to a minimum.

For mounting the sealing ring, the driver preferably has a run-on slope for moving axially over the outer step in the mounting direction, wherein, for the automatic removal of the transport and mounting protective sleeve counter to the mounting direction, the driver has a second driver surface which extends substantially in the radial direction and, after the sealing ring is mounted, can be placed against the first driver surface when the punch moves counter to the mounting direction. The first driver surface of the transport and mounting protective sleeve and the second driver surface of the driver of the punch are accordingly functionally coordinated with each other. For example, the two driver surfaces can each be formed flat and can thereby bear in a planar manner against each other.

The transport and mounting protective sleeve is preferably composed of an elastically deformable material, for example of a polymeric material. During the axial movement of the run-on slope (or leading slope) over the driver surface of the outer step during the mounting of the sealing ring, the transport and mounting protective sleeve is deformed elastically and resumes the original shape thereof as soon as the run-on slope (or leading slope) has moved over the first driver surface in the axial direction. Following the mounting of the sealing ring, when the punch moves in the opposite direction axially to the mounting direction, the first driver surface and the latching-lug-shaped driver enter into engagement with each other, and therefore the transport and mounting protective sleeve is automatically pulled off by the axial movement of the punch in the opposite direction to the mounting direction.

The outer step can have at least one projection which can be brought into engagement in the circumferential direction with a mating projection of the driver in a bayonet-like manner. By means of such a configuration, there is the option for the transport and mounting protective sleeve, while being carried along axially in the opposite direction to the mounting direction, to be simultaneously rotated about the axis of symmetry thereof. As a result, the transport and mounting protective sleeve can be pulled off more easily.

The punch preferably has, in the mounting direction, a sleeve-shaped axial projection with an axial length which corresponds at least to the sum of the axial lengths of the inner step and outer step, and with a free end side. It is of advantage in this connection that the sealing ring can always be reliably pushed downward from the transport and mounting protective sleeve in the axial direction without damage by means of the punch and positioned in the installation space thereof. The installation of the sealing ring in the installation space thereof can take place in two steps here. First of all, the punch pushes the sealing ring, for example by the outer circumference thereof, into the housing of a machine element until the outer circumference of the sealing ring is completely surrounded by the housing. In the second step which directly adjoins the first step, the sealing ring is then pushed axially by the punch from the inner step onto the surface to be sealed of the machine element to be sealed, wherein the outside diameter of the inner step is at least the same size as the outside diameter of the machine element to be sealed. As a result, the sealing ring can be pushed axially, without the at least one dynamically stressed sealing lip thereof being damaged, from the inner step onto the machine element to be sealed.

Starting from the free end side of the axial projection, the driver can be arranged on the inner circumference of the axial projection in a manner set back counter to the mounting direction by the axial length of the inner step. As a result, the transport and mounting protective sleeve, after removal thereof, is enclosed along the entire axial extent thereof by the punch. The transport and mounting protective sleeve is thereby readily protected during the removal thereof against external influences.

The driver can be formed in a peripherally self-contained manner in the circumferential direction. By means of such a configuration of the driver, the latter bears over a comparatively large area against the first driver surface of the transport and mounting protective sleeve and can pull the latter off from the sealing ring in a tilt-free manner and with minimal specific surface pressure. The process reliability is optimized by a driver formed in a peripherally self-contained manner.

The outer step can have an outer circumference, wherein the punch is guided on the outer circumference of the outer step. By means of this guidance, not only are the punch and the transport and mounting protective sleeve positioned particularly exactly with respect to each other, but so too the sealing ring which initially surrounds the inner step of the transport and mounting protective sleeve. Such a good spatial assignment to one another is of advantage for easy mounting of the sealing ring into the installation space thereof. It is ensured by said good spatial assignment that the sealing ring, during the mounting thereof, moves into the installation space in a tilt-free manner and, as a result, is not damaged, and, in particular, that the sealing lips of the sealing ring remain undamaged.

The axial projection has an outer circumference with an outside diameter, the sealing ring to be mounted has an outside diameter, and the outside diameter of the outer circumference preferably corresponds to the outside diameter of the sealing ring to be mounted. By means of such a configuration, the free end side of the axial projection is placed as far on the outside as possible in the radial direction onto the axially adjacent end side of the sealing ring. As a result, when the sealing ring is pushed axially into the installation space thereof, not only is the sealing ring guided by the delimiting wall of the installation space, but so too is the punch in the region of the axial projection thereof. Owing to the fact that both the sealing ring and the axial projection have the same outside diameter and, during the mounting of the sealing ring into the installation space thereof, the two components are guided by the same installation space wall delimiting the installation space, the mounting of the sealing ring takes place in a particularly reliable manner without tilting and without resulting mechanical overstressing of the sealing ring, in particular of the material, of which the dynamically stressed sealing lips are composed.

The sum of radial thickness of the outer step and radial thickness of the axial projection preferably corresponds to the height of the sealing ring to be mounted. As a result, the entire end side is substantially uniformly loaded during the mounting of the sealing ring. Punctiform overstressing and resulting possible damage are thereby prevented. The surface pressure on the end side of the sealing ring during the mounting thereof is thereby comparable.

The axial projection, on the side thereof facing away axially from the free end side, can have a stop which limits the axial mounting travel of the sealing ring into the installation space thereof. During the mounting operation of the sealing ring into the installation space thereof, said stop is placed, for example, against a mating stop of the machine element to be sealed. The mounted sealing ring is always exactly positioned in the axial direction with respect to said mating stop.

The transport and mounting protective sleeve can preferably be composed of a polymeric material. It is of advantage here that such a transport and mounting protective sleeve can be produced simply and cost-effectively. In addition, it can frequently be reused following the mounting of the sealing ring.

Depending on the particular circumstances of the use situation, there is the possibility that the transport and mounting protective sleeve is composed of a friction-reducing polymeric material, such as, for example, PTFE, is coated, for example, by an anti-friction paint. As a result, both the stripping off of the sealing ring from the inner step of the transport and mounting protective sleeve and the guidance of the punch on the outer circumference of the outer step take place in a particularly low-friction manner. Abrasive wear of the respective friction partners is thereby restricted to a minimum.

In addition, the transport and mounting protective sleeve is preferably formed integrally and from one material. It can thereby be produced simply and cost-effectively and, if the need arises, can be recycled in a correctly sorted manner.

The transport and mounting protective sleeve preferably forms a preassemblable unit with the sealing ring to be mounted. The effect achieved by said preassemblable unit is that the sealing ring mounted on the transport and mounting protective sleeve is readily protected against external influences and therefore against damage during the mounting thereof and during the transport. In addition, the sealing ring is thereby kept in shape during the mounting and the transport. For the mounting, the preassemblable unit is first of all positioned axially in the mounting direction on the installation space of the sealing ring, thus conveniently initially plugged substantially loosely, for example, onto the shaft to be sealed. The punch is subsequently brought in the axial direction up to the preassemblable unit and pushes the sealing ring, as described previously, in the axial direction from the transport and mounting protective sleeve into the installation space. The punch is then pulled back counter to the mounting direction and, in the process, automatically carries along the transport and mounting protective sleeve.

The punch can be composed of a metallic material. Punches of such a material have long service lives.

In addition, the invention relates to a sealing ring which forms a preassemblable unit with a transport and mounting protective sleeve, as previously described.

As previously described, the sealing ring is readily protected by the transport and mounting protective sleeve against external influences, and the mounting of the sealing ring into the installation space thereof can be undertaken in a simple and reliable manner by the preassemblable unit. After the sealing ring has been mounted, the transport and mounting protective sleeve can be automatically removed by an adapted punch of a mounting device.

An exemplary embodiment of the mounting device according to the invention and of the sealing ring, which forms a preassemblable unit with the transport and mounting protective sleeve, are respectively explained in more detail below with reference to FIGS. 1, 2 and 3.

FIG. 1 shows the mounting device according to the invention. The sealing ring 1 to be mounted is mounted on the transport and mounting protective sleeve 2 and is intended to be mounted into the installation space 35 by the mounting device. The machine element 8 to be sealed is designed here as a shaft; the sealing ring 1 as a radial shaft sealing ring.

In order to mount the preassemblable unit 36, comprising the sealing ring 1 and the transport and mounting protective sleeve 2, the preassemblable unit 36 is first of all threaded onto the machine element 8 to be sealed and is moved axially as far as the limit of the installation space 35.

The sleeve-shaped punch 3 takes on the pressing of the preassemblable unit into the installation space 35.

As soon as the preassemblable unit 36 with the sealing ring 1 is assigned in a manner loosely adjacent to the installation space 35, the punch 3 moves axially over the end side of the machine element 8 to be sealed axially in the direction of the preassemblable unit 36, in the process moves with the axial projection 20 thereof and the latching-lugshaped driver 15 over the first driver surface 14 and the outer step 13 until the free end side 24 of the axial projection 20 is in bearing contact with that end side of the sealing ring 1 which faces the punch 3 axially.

Subsequently, the entire preassemblable unit 36 is pushed axially into the installation space 35, specifically until the free end-side edge 37 of the inner step 5 is in bearing contact with a stop of the machine element 8 to be sealed. The transport and mounting protective sleeve 2 of the preassemblable unit 36 cannot then be displaced further axially into the installation space 35.

The punch 3 is nevertheless displaced axially in the mounting direction 11 further in the direction of the installation space 35, wherein only the sealing ring 1 is then still moved by the preassemblable unit 36 axially in the direction of the installation space 35. Said sealing ring is stripped off from the inner step 5 by the punch and positioned correctly in the installation space 35 thereof.

The outside diameter 6 of the inner step 5, which is surrounded initially in a close-fitting manner by the sealing lip of the sealing ring 1, corresponds to the outside diameter 7 of the surface to be sealed of the machine element 8 to be sealed, and therefore the sealing ring 1 can easily be pushed by the punch 3 from the inner step 5 of the transport and mounting protective sleeve 2 into the installation space 35 without the sensitive sealing lips of the sealing ring 1 being damaged.

If the sealing ring 1 has reached the axial installation position thereof, the punch 3 is moved back axially in the opposite direction to the mounting direction 11 and, by means of the latching-lug-shaped driver 15 thereof, caries along the transport and mounting protective sleeve 2 from the machine element 8 to be sealed. For this purpose, the latching-lug-shaped driver 15 interlocks with the first driver surface 14 of the transport and mounting protective sleeve 2.

After the sealing ring 1 is mounted, the transport and mounting protective sleeve 2 is automatically removed by the punch 3.

The inner step 5 has, axially in the opposite direction to the mounting direction 11, an end-side stop 12 for the sealing ring 1, wherein the sealing ring 1 is then in bearing contact with said end-side stop 12 when the sealing ring forms the preassemblable unit 36 with the transport and mounting protective sleeve 2. The end-side stop 12 separates the inner step 5 in the axial direction 4 from the outer step 13 which has the first driver surface 14 with which the latching-lug-shaped driver 15 of the punch 3 can be brought into engagement.

The transport and mounting protective sleeve 2 has to be coordinated with the sleeve-shaped punch 3 in such a manner that, when the punch 3 moves in the opposite direction to the mounting direction 11, the transport and mounting protective sleeve 2 is automatically removed from the installation space 35. For this purpose, the driver 15 has the run-on slope (or leading slope) 17 and the second driver surface 19. The run-on slope (or leading slope) 17 makes it possible for the driver 15, for the mounting of the sealing ring 1 in the installation space 35, to move over the first driver surface 14 and the outer step 13 in the mounting direction 11, wherein the second driver surface 19, which extends substantially in the radial direction 18, can be placed against the first driver surface 14 in order automatically to carry along the transport and mounting protective sleeve 2 from the installation space 35 during movements of the punch 3 axially counter to the mounting direction 11. FIG. 3 illustrates a partial view of the sleeve-shaped punch from FIG. 1 together with a partial view of the transport and mounting protective sleeve from FIG. 2. FIG. 3 illustrates the axial projection 20 and the second driver surface 19. FIG. 3 also illustrates the inner step 5, outer step 13, and the first driver surface 14. Referring back to FIG. 1, the axial projection 20 of the punch 3 has an axial length 21 which, in the exemplary embodiment shown here, is somewhat greater than the sum of the axial length 22, 23 of inner step 5 and outer step 13.

After the punch 3 has carried along the transport and mounting protective sleeve 2 during an axial movement counter to the mounting direction 11, the transport and mounting protective sleeve 2 is completely surrounded by the axial projection 20 and is thereby readily protected from external influences. The latching-lug-shaped driver 15 is formed in a peripherally self-contained manner in the circumferential direction 26.

The outer circumference 27 of the outer step 13 forms a guide surface for the punch 3, wherein the inner circumference 25 of the axial projection 20 forms the mating guide surface with respect to the outer circumference 27 of the outer step 13. As a result, a tilt-free assignment and relative movability of the respective components during the mounting of the sealing ring 1 is ensured.

The outside diameter 29 of the outer circumference 28 of the axial projection 20 corresponds approximately to the outside diameter 30 of the sealing ring 1 to be mounted, wherein the sum of radial thickness 31 of the outer step 13 and radial thickness 32 of the axial projection 20 corresponds to the height 33 of the sealing ring 1 to be mounted.

Figure 2:
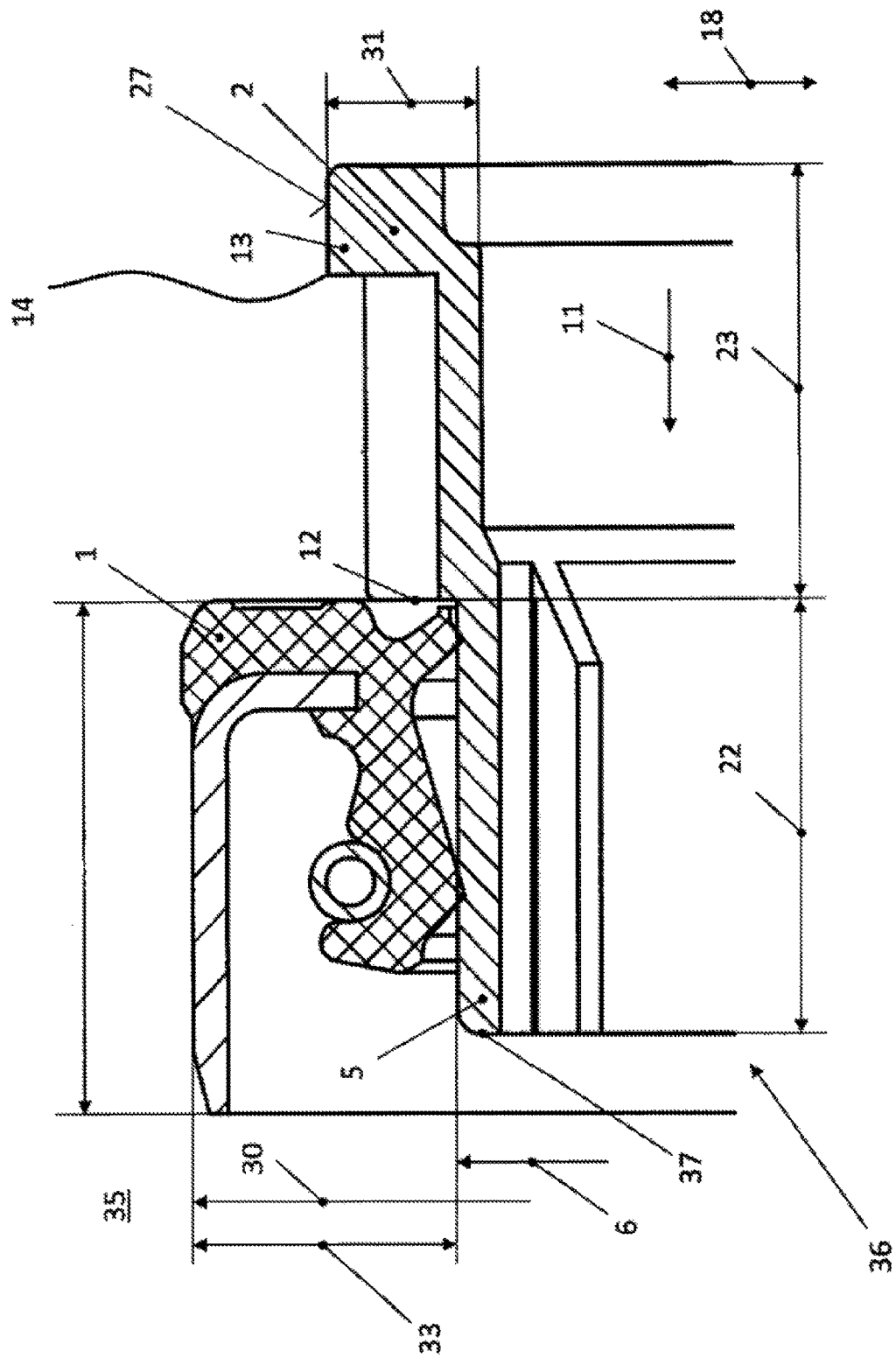
Figure 3:
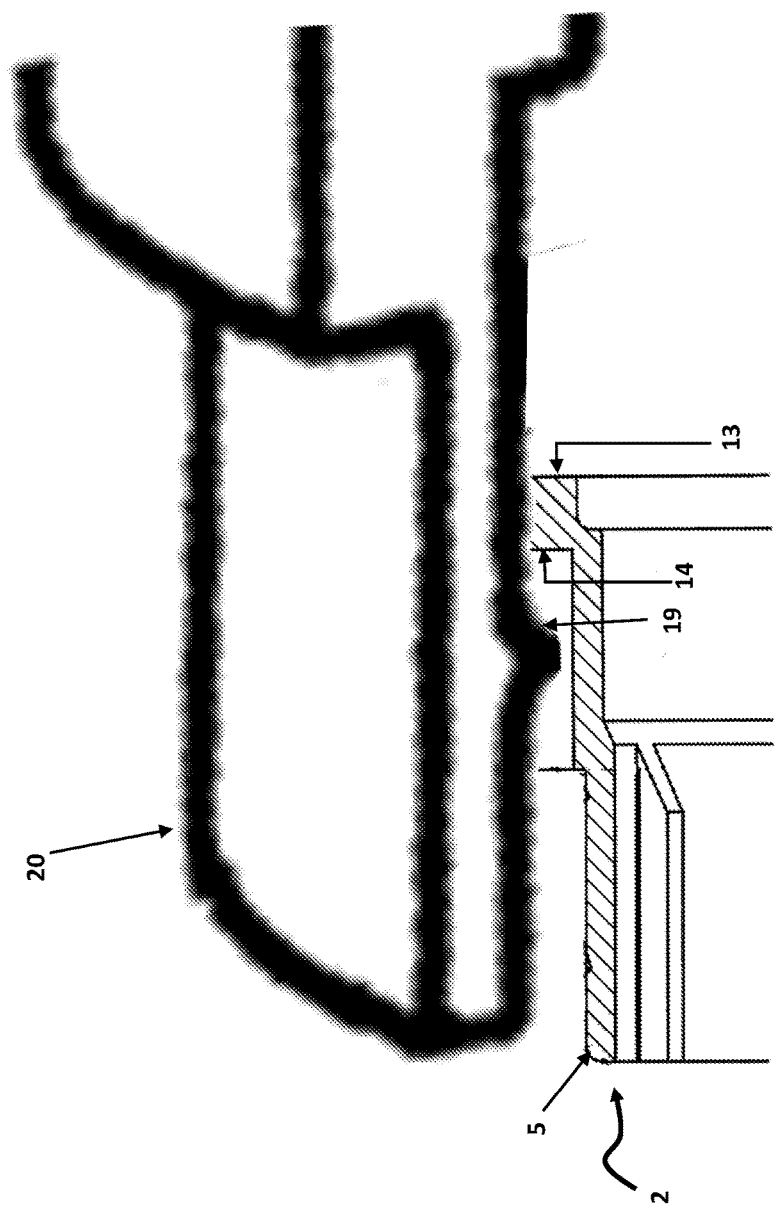

FIG. 2 shows the preassemblable unit 36 which comprises the sealing ring 1 and the transport and mounting protective sleeve 2, wherein the sealing ring 1 surrounds the inner step 5 of the transport and mounting protective sleeve 2 in a close-fitting manner and is supported in the axial direction 4 on the end-side stop 12 of the inner step 5.

In the exemplary embodiment shown here, the transport and mounting protective sleeve 2 is composed of a polymeric material and is formed integrally and from the same material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A mounting device for mounting a sealing ring in a mounting direction to seal a machine element, the device comprising:
    a protective sleeve configured to transport and mount the sealing ring; and
    a sleeve-shaped punch,
    wherein the protective sleeve is configured to be moved axially in the mounting direction and a removal direction using the sleeve-shaped punch, the removal direction being opposite to the mounting direction,
    wherein the protective sleeve is configured to be separated from the sealing ring by moving the sleeve-shaped punch in the removal direction after the sealing ring is mounted,
    wherein the protective sleeve includes an inner step, the inner step extending axially,
    wherein an outside diameter of the inner step has a magnitude that is configured to substantially correspond to that of an outside diameter of the machine element,
    wherein an axial length of the inner step has a magnitude that is configured to substantially correspond to that of an axial length of the sealing ring,
    wherein the inner step is bounded axially in the removal direction by at least one end-side stop, which is configured to be in contact with the sealing ring when mounting the sealing ring,
    wherein the end-side stop forms part of an outer step, the outer step extending axially,
    wherein the outer step includes a first driver surface, and
    wherein the first driver surface is configured such that at least one latching driver of the sleeve-shaped punch is engageable with the first driver surface for removal of the protective sleeve when the sleeve-shaped punch moves in the removal direction.

2. The mounting device of claim 1, wherein the first driver surface is formed by an end side of the outer step, and
    wherein the end side axially faces the inner step.

3. The mounting device of claim 1, wherein the latching driver includes a leading slope configured to allow the latching driver to move axially over the outer step when moving in the mounting direction, and
    wherein the latching driver has a second driver surface extending substantially in a radial direction, the second driver surface configured to be placed against the first driver surface when the sleeve-shaped punch moves in the removal direction to remove the protective sleeve from the sealing ring after the sealing ring is mounted.

4. The mounting device of claim 1, wherein the outer step is configured to engage with the latching-lug-shaped driver in a bayonet-like manner.

5. The mounting device of claim 1, wherein the sleeve-shaped punch includes a sleeve-shaped axial projection extending in the axial direction, which has an axial length corresponding at least to a sum of the axial lengths of the inner step and an axial length of the outer step, and
    wherein the sleeve-shaped axial projection includes a free end side.

6. The mounting device of claim 5, wherein, starting from the free end side of the sleeve-shaped axial projection, the latching driver is arranged on an inner circumference of the sleeve-shaped axial projection in a manner set back in the removal direction by the axial length of the inner step.

7. The mounting device of claim 6, wherein the latching driver is formed in a circumferential direction.

8. The mounting device of claim 5, wherein the outer step has an outer circumference, and wherein the sleeve-shaped punch is configured to be guided on the outer circumference of the outer step when mounting the sealing ring.

9. The mounting device of claim 8, wherein an inner circumference of the sleeve-shaped axial projection is guided on the outer circumference of the outer step.

10. The mounting device of claim 5, wherein an outside diameter of an outer circumference of the sleeve-shaped axial projection is configured to correspond to an outside diameter of the sealing ring.

11. The mounting device of claim 5, wherein a sum of (i) a radial thickness of the outer step and (ii) a radial thickness of the sleeve-shaped axial projection is configured to corresponds to a height of the sealing ring.

12. The mounting device of claim 5, wherein the sleeve-shaped axial projection, on a side thereof facing away axially from the free end side, includes a projection stop, and
    wherein the projection stop is configured to limit an axial mounting travel of the sealing ring into an installation space of the machine element.

13. The mounting device of claim 1, wherein the protective sleeve includes a polymeric material.

14. The mounting device of claim 1, wherein the protective sleeve is configured such that it is capable of forming a preassemblable unit with the sealing ring.

15. The mounting device of claim 1, wherein the sleeve-shaped punch includes a metallic material.

16. A protective sleeve for forming a preassemblable unit with a sealing ring, the protective sleeve further for protecting the sealing ring and axially transporting the sealing ring in a mounting direction to seal a machine element, the protective sleeve comprising:
    an inner step, which extends axially, has an outside diameter configured to correspond to an outside diameter of the machine element, has an axial length configured to substantially correspond to an axial length of the sealing ring, and is bounded axially in a removal direction, the removal direction being opposite to the mounting direction, by at least one end-side stop, and
    an outer step, which extends axially and includes the end-side stop and a first driver surface, wherein
    the end-side stop is configured to contact the sealing ring when the protective sleeve is formed in the preassemblable unit with the sealing ring,
    the protective sleeve is configured to be axially moved in the mounting direction by a sleeve-shaped punch to mount the sealing ring, and
    the first driver surface is configured to engage with a latching driver of the sleeve-shaped punch to separate the protective sleeve from the sealing ring when the sleeve-shaped punch moves in the removal direction after mounting the sealing ring.

* * * * *